United States Patent Office 3,108,935
Patented Oct. 29, 1963

3,108,935
NUCLEAR REACTOR COOLANTS
Hendricus M. Penning and Martinus Kolijn, The Hague, Netherlands, assignors to Shell Oil Company, a corporation of Delaware
No Drawing. Filed Aug. 31, 1959, Ser. No. 836,935
Claims priority, application Netherlands Sept. 5, 1958
2 Claims. (Cl. 204—154.2)

This invention relates to the cooling of nuclear reactors and in particular to the cooling of nuclear reactors by means of aromatic hydrocarbons.

The cooling medium for nuclear reactors may be gaseous or liquid. In general, a coolant should possess the following characteristics: (1) good thermal properties, e.g., high specific heat and thermal conductivity; (2) low power requirement for pumping; (3) high boiling point and low melting point; (4) stability to heat and radiation; (5) suitable corrosion characteristics in the given system; (6) small cross section for neutron capture; (7) non-hazardous, including no or low toxicity and low induced radioactivity; and (8) low cost.

In view of the numerous characteristics required of a nuclear reactor coolant it is difficult to find materials suitable for such a purpose. Hydrocarbons are known to have some of the desired characteristics for a nuclear reactor coolant and have been proposed for such a use. Hydrocarbons have the additional advantage that the component elements hydrogen and carbon have a good moderating capacity as well as a reasonably low absorption cross-section with regard to fast neutrons, so that these compounds may be used both as a coolant and a moderator material. However, the relative instability to radiation apparently has been the main difficulty in connection with the use of organic compounds as reactor coolants.

In view of the strict requirements for nuclear reactor coolants, particularly in regard to stability to nuclear radiation and to thermal stability, only few organic compounds are suitable for such purposes. Examples of suitable compounds are alkyl naphthalenes, diphenyl methane, biphenyl and diphenyl oxide, as well as a eutectic mixture thereof, tetraaryl silicates, alkylated or chlorinated biphenyls, naphthalene, anthracene, phenanthrene, chrysene, mixtures of polynuclear aromatic hydrocarbons obtained by pyrolysis of benzene and biphenyl, and polyphenyls, in particular terphenyls and eutectic mixtures thereof.

Use of these materials, however, has been mostly limited to special purposes owing to their insufficient stability with regard to nuclear radiation and high temperatures, too low boiling points, too high melting points, too high viscosities, and the like.

In addition, these materials have the disadvantage of being comparatively expensive, so that a purification system is necessary to remove undesirable viscous and/or gaseous degradation products from the system.

It is an object of this invention to provide a hydrocarbon fraction suitable for use as a coolant in nuclear reactors. It is a particular object to provide an aromatic hydrocarbon suitable for use as a coolant in nuclear reactors and which is relatively inexpensive compared to organic compounds previously suggested for such use.

It has now been found that an aromatic hydrocarbon fraction obtained by extraction of a catalytically cracked cycle oil which has been refined by a catalytic treatment with hydrogen is stable to nuclear radiation and is advantageous for use as a coolant in nuclear reactors.

By "cycle oil" is meant a hydrocarbon fraction, preferably boiling in the range of 200° C. to 500° C., which is separated from the product obtained in catalytic cracking, and which may be recycled to the cracking process, if desired, together with the feed, so as to be again subjected to the catalytic cracking treatment.

Heavy cycle oils in particular having a boiling range of from 300° C. to 500° C. are very suitable starting materials for the preparation of the coolant according to the invention. These heavy cycle oils are very rich in aromatic compounds, but usually contain relatively large amounts of sulfur and nitrogen compounds. In a nuclear reactor, sulfur and nitrogen are converted into radioactive elements by the radiation occurring. Therefore it is desirable to remove the sulfur and nitrogen compounds, or at least the greater part thereof.

When heavy cycle oils are separated by means of a selective solvent for aromatic components into a relatively non-aromatic raffinate and an aromatic extract, a considerable amount of the sulfur compounds are concentrated in the extract phase. It is possible to reduce the sulfur content of the extract to permissible limits by a catalytic treatment with hydrogen. However, the stability of such desulfurized extracts to nuclear radiation is considerably decreased.

According to the invention, an extract which is low in sulfur, stable to nuclear radiation, and suitable as a coolant in nuclear reactors, especially fission reactors, is prepared from a cycle oil which has been subjected to a catalytic treatment with hydrogen before extraction. The extract is relatively inexpensive since the cycle oil starting material is readily available at most refineries and therefore is of low cost.

The catalytic treatment with hydrogen is preferably carried out in the presence of a catalyst which is selective for the hydrogenation of organic sulfur compounds, e.g., a catalyst comprising both an oxide or sulfide of a metal of the iron group and an oxide or sulfide of a metal of the left-hand column of group VI of the periodic system supported on alumina or bauxite. A catalyst comprising cobalt oxide and molybdenum oxide supported on alumina is particularly suitable. Catalysts of this type are known per se and have been described in patent and literature publications.

The catalytic treatment with hydrogen should be carried out under conditions ensuring hydrogenation of the sulfur compounds and nitrogen compounds, but without the aromatic hydrocarbons becoming noticeably saturated. Therefore, a hydrogen pressure in the range of from 25 to 75 atm. and a reaction temperature in the range of from 350° C. to 400° C. is preferred. In this way a product can be obtained containing less than 0.5% and preferably less than 0.2% of sulfur.

In view of the high viscosity of the heavy cycle oil it is frequently desirable for the catalytic hydrogen treatment to be carried out after the viscosity of the starting material has been reduced by dilution with a light hydrocarbon fraction. The diluents used may be, for example, light petroleum distillates with a boiling range of 80° C. to 200° C., such as naphtha. The diluent should, of course, be removed either immediately upon the catalytic hydrogen treatment, or upon the extraction, this removal preferably being effected by means of distillation. During the distillation, reaction products which have been formed in the catalytic refining treatment and have a lower boiling point than the feed are also removed.

Distillation immediately following the catalytic hydrogen treatment is preferred, the extraction unit being less heavily loaded as a result.

The refined cycle oil may be extracted by means of any selective solvent for aromatic compounds known in the art, e.g., phenol, nitrobenzene or liquid sulfur dioxide, but furfural is preferred.

The extraction may be carried out at elevated temperature ranging, for example, from 50° C. to 100° C., in a conventional extraction column in which the oil is contacted with the selective solvent in counter-current flow. The extraction may also be carried out in a rotating disc extraction unit, as described in the Netherlands patent specification 67,932.

The aromatic extracts of the invention may be employed as primary or secondary heat transfer agents in nuclear reactors. They may be used to remove directly the heat formed by the nuclear fission process from the reaction zone, for example to a steam generator. They may also be used as secondary heat transfer agents, for example when molten sodium or carbon dioxide is used as primary heat transfer agent.

If desired, a purification unit may be provided within the circuit for the removal of any high molecular weight material formed by polymerization of the free radicals produced in the heat transfer agent through nuclear radiation. This may be effected, for example, by means of distillation, a product having a similar boiling range as the original aromatic extract being separated as a side stream and recycled to the circuit, the polymers being separated as bottom product and the gases formed through the nuclear radiation (mainly hydrogen) as top product.

The heat transfer agent to be used according to the invention is inexpensive compared to the aromatic compounds such as the terphenyls used hitherto, so that in many cases it is advantageous not to use a purification unit, but to remove a quantity of the material from the circuit ("bleeding"), and making up with fresh material so as to keep the increase in the viscosity of the circulating heat transfer agent within reasonable limits.

*Example*

The starting material was a heavy cycle oil obtained by catalytic cracking of a Middle East crude oil distillate. The cycle oil had an initial boiling point of 350° C., 90% of the oil distilling over below 440° C. The aromatic compound content (determined by percolation over silica gel) was 53% and the sulfur content 2.5%.

The starting material was diluted with an equal volume of naphtha (boiling range 118° C.–181° C.) after which the mixture was subjected to hydrogenation at a temperature of from 360° C. to 375° C. and a pressure of 50 kg./cm.$^2$.

After removal of the naphtha and the low-boiling reaction products of the hydrogen treatment by means of distillation up to a temperature of 350° C., the product was extracted with furfural as selective solvent. The aromatic extract comprised 86.7% of aromatic compounds and 0.5% of sulfur. On irradiation with thermal neutrons and associated radiation in a nuclear reactor, there was only a slight increase in the viscosity of the extract.

In a specific embodiment of the process, the extract is circulated through a nuclear reactor to absorb and remove heat liberated by the fission reaction. With heterogeneous reactors, the extract, in passing through the reactor, is in direct contact with the fuel elements.

We claim as our invention:

1. In the operation of a nuclear reactor wherein a fluid is passed through the reactor to absorb and remove heat liberated by the nuclear fuel, the improvement wherein the aromatic extract is passed through the reactor to absorb and remove heat liberated by the nuclear fuel, said aromatic extract having a sulfur content no more than 0.5% by weight and is obtained from a catalytically cracked cycle oil boiling within the range of 300–500° C., said oil being rich in aromatic compounds and containing relatively large amounts of sulfur, by diluting the cycle oil with a hydrocarbon fraction boiling in the range of 80–200° C., subjecting the diluted cycle oil to a catalytic hydrogenation at 25–75 atmospheres hydrogen pressure and 350–400° C. in the presence of a hydrogenation catalyst of the group consisting of oxides and sulfides of the iron group and a second catalyst of the group consisting of oxides and sulfides of a metal of the left-hand column of group VI of the periodic table, said catalyst being deposited on a support of the group consisting of alumina or bauxite, so as to selectively hydrogenate and remove contained sulfur compounds without appreciably saturating the aromatic hydrocarbon, whereby the sulfur content is reduced to less than 0.5%, fractionally distilling the hydrogenated product to remove all fractions boiling below about 350° C., extracting the treated cycle oil with a selective solvent at 50–100° C., and recovering an aromatic rich mixture from the solvent extract.

2. A process according to claim 1 wherein the catalytic treatment with hydrogen is carried out at a pressure of 25–75 atmospheres, at a temperature of 350–400° C., and in the presence of a catalyst comprising cobalt oxide and molybdenum oxide supported on alumina.

References Cited in the file of this patent

UNITED STATES PATENTS

| | | |
|---|---|---|
| 2,764,529 | Leygonie et al. | Sept. 25, 1956 |
| 2,768,129 | Knox | Oct. 23, 1956 |
| 2,860,093 | Wigner et al. | Nov. 11, 1958 |
| 2,883,331 | Bolt et al. | Apr. 21, 1959 |
| 2,902,425 | Kosmin et al. | Sept. 1, 1959 |
| 2,921,891 | Colichman et al. | Jan. 19, 1960 |

FOREIGN PATENTS

| | | |
|---|---|---|
| 697,601 | Great Britain | Sept. 23, 1953 |

OTHER REFERENCES

Atomic Energy Commission Document: TID–7007 (Part 1) Compilation of Organic Moderator and Coolant Technology, Smith, Jan. 24, 1957, pages 34, 47, 52, 97, 183 and 184.